(12) United States Patent
Hosono et al.

(10) Patent No.: US 11,812,507 B2
(45) Date of Patent: Nov. 7, 2023

(54) WIRELESS COMMUNICATION SYSTEM THAT PERFORMS COMMUNICATION

(71) Applicant: JVCKENWOOD Corporation, Yokohama (JP)

(72) Inventors: Eiichi Hosono, Yokohama (JP); Takashi Shimizu, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 184 days.

(21) Appl. No.: 17/453,369

(22) Filed: Nov. 3, 2021

(65) Prior Publication Data
US 2022/0201466 A1   Jun. 23, 2022

(30) Foreign Application Priority Data

Dec. 22, 2020  (JP) .................. 2020-212065
Dec. 22, 2020  (JP) .................. 2020-212066
Dec. 22, 2020  (JP) .................. 2020-212067

(51) Int. Cl.
*H04W 8/22*   (2009.01)
*H04W 4/10*   (2009.01)

(52) U.S. Cl.
CPC ............... *H04W 8/22* (2013.01); *H04W 4/10* (2013.01)

(58) Field of Classification Search
CPC .......... H04W 4/10; H04W 8/22; H04W 88/06
See application file for complete search history.

(56) References Cited

U.S. PATENT DOCUMENTS

2009/0017881 A1\* 1/2009 Madrigal ............ H04M 1/0258
455/575.1

FOREIGN PATENT DOCUMENTS

JP    2008-178007 A    7/2008

\* cited by examiner

*Primary Examiner* — Lester G Kincaid
*Assistant Examiner* — Dung L Lam
(74) *Attorney, Agent, or Firm* — Shih IP Law Group, PLLC

(57) ABSTRACT

When a mobile wireless terminal device and a portable wireless terminal device perform wireless communication according to a second wireless communication scheme, the portable wireless terminal device receives a touch parameter from the mobile wireless terminal device. When the touch parameter does not indicate "touched", the mobile wireless terminal device activates wireless communication according to a first wireless communication scheme, and the portable wireless terminal device suspends wireless communication according to the first wireless communication scheme. When the touch parameter indicates "touched", the mobile wireless terminal device activates wireless communication according to the first wireless communication scheme, and the portable wireless terminal device activates wireless communication according to the first wireless communication scheme.

9 Claims, 10 Drawing Sheets

FIG.3A

| FIELD | VALUE |
|---|---|
| COMMON IDENTIFIER | 500 |
| DEDICATED IDENTIFIER | 400 |
| NEAR-FIELD IDENTIFIER | 10 |
| REGISTERED NEAR-FIELD IDENTIFIER | 20 |

| FIELD | VALUE |
|---|---|
| COMMON IDENTIFIER | 500 |
| NEAR-FIELD IDENTIFIER | 20 |
| REGISTERED NEAR-FIELD IDENTIFIER | 10 |

320

WIRELESS COMMUNICATION SYSTEM THAT PERFORMS COMMUNICATION

CROSS-REFERENCE TO RELATED APPLICATION

This application is based upon and claims the benefit of priority from the prior Japanese Patent Application No. 2020-212065, filed on Dec. 22, 2020, the prior Japanese Patent Application No. 2020-212066, filed on Dec. 22, 2020, and the prior Japanese Patent Application No. 2020-212067, filed on Dec. 22, 2020, the entire contents of which is incorporated herein by reference.

BACKGROUND OF THE INVENTION

1. Field

The present invention relates to communication technology and, more particularly, to a wireless communication system that performs communication.

2. Description of the Related Art

A single cellular phone unit may sometimes be comprised of a main unit and a subunit that can be separated from each other. Each of the main unit and the subunit is provided with an external communication function. Since a single telephone number is used for operation, a situation in which the external communication functions of both units are activated should be avoided. Thus, when the main unit and the subunit are joined, only the external communication function of the main unit is activated. When the main unit and the subunit are separated, on the other hand, the external communication function of the main unit and the external communication function of the subunit are activated alternately (see, for example, patent literature 1).
[Patent literature 1] JP2008-178007

Even in the case of two wireless terminal devices configured separately, one of the two wireless terminal devices may be selectively used by using a single identifier such as a telephone number for operation. When a wireless terminal device touched by a person who has developed an infectious disease is operated by another person, the other person may also develop the infectious disease.

SUMMARY OF THE INVENTION

A wireless communication system according to an embodiment includes a first wireless terminal device and a second wireless terminal device capable of performing wireless communication according to a first wireless communication scheme and capable of performing wireless communication according to a second wireless communication scheme different from the first wireless communication scheme. The first wireless terminal device manages a touch parameter indicating whether a user other than a user of the second wireless terminal device touches the first wireless terminal device. when the first wireless terminal device and the second wireless terminal device perform wireless communication according to the second wireless communication scheme, the second wireless terminal device receives the touch parameter from the first wireless terminal device. When the touch parameter does not indicate "touched", the first wireless terminal device activates wireless communication according to the first wireless communication scheme, and the second wireless terminal device suspends wireless communication according to the first wireless communication scheme. When the touch parameter indicates "touched", the first wireless terminal device activates wireless communication according to the first wireless communication scheme, and the second wireless terminal device activates wireless communication according to the first wireless communication scheme.

Another embodiment also relates to a wireless communication system. The wireless communication system includes a first wireless terminal device and a second wireless terminal device capable of performing wireless communication according to a first wireless communication scheme and capable of performing wireless communication according to a second wireless communication scheme different from the first wireless communication scheme. The first wireless terminal device manages a touch parameter indicating whether a user other than a user of the second wireless terminal device touches the first wireless terminal device. When the first wireless terminal device and the second wireless terminal device perform wireless communication according to the second wireless communication scheme, the second wireless terminal device receives the touch parameter from the first wireless terminal device. When the touch parameter does not indicate "touched", the first wireless terminal device activates wireless communication according to the first wireless communication scheme, and the second wireless terminal device suspends wireless communication according to the first wireless communication scheme. When the touch parameter indicates "touched", the first wireless terminal device suspends wireless communication according to the first wireless communication scheme, and the second wireless terminal device activates wireless communication according to the first wireless communication scheme.

Still another embodiment relates to a wireless communication system. The wireless communication system includes a first wireless terminal device and a second wireless terminal device capable of performing wireless communication according to a first wireless communication scheme and capable of performing wireless communication according to a second wireless communication scheme different from the first wireless communication scheme. The first wireless terminal device manages a touch parameter indicating whether a user other than a user of the second wireless terminal device touches the first wireless terminal device. When the first wireless terminal device and the second wireless terminal device perform wireless communication according to the second wireless communication scheme, the second wireless terminal device receives the touch parameter from the first wireless terminal device. When the touch parameter does not indicate "touched", the first wireless terminal device activates wireless communication according to the first wireless communication scheme and suspends headset PTT communication according to the second wireless communication scheme, and the second wireless terminal device suspends wireless communication according to the first wireless communication scheme and suspends headset PTT communication according to the second wireless communication scheme. When the touch parameter indicates "touched", the first wireless terminal device activates wireless communication according to the first wireless communication scheme and activates headset PTT communication according to the second wireless communication scheme, and the second wireless terminal device suspends wireless communication according to the first wireless communication scheme and activates headset PTT communication according to the second wireless communication scheme.

Optional combinations of the aforementioned constituting elements, and implementations of the embodiment in the form of methods, apparatuses, systems, recording mediums, and computer programs, etc. may also be practiced as additional modes of the embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 3A-3B show data structures of databases stored in the storage units of FIG. 2;

DETAILED DESCRIPTION OF THE PREFERRED EMBODIMENT

Figure 1A:
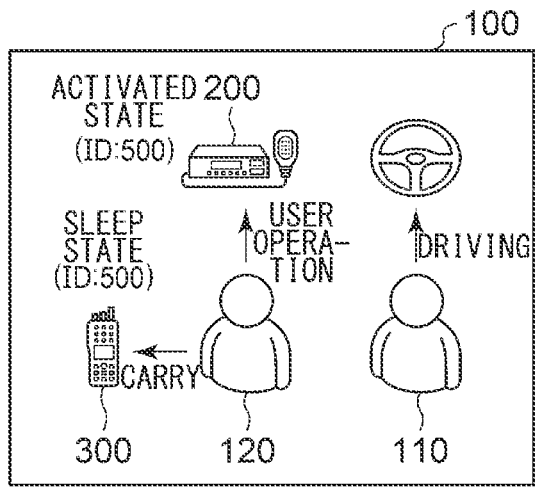
FIGS. 1A-1D show an outline of the operation in a wireless communication system according to embodiment 1.

The invention will now be described by reference to the preferred embodiments. This does not intend to limit the scope of the present invention, but to exemplify the invention.

Embodiment 1

A brief summary will be given before describing the invention in specific details. Embodiment 1 relates to a wireless communication system formed by a plurality of wireless terminal devices and a base station device, in which communication is performed via the base station device. An example of the wireless communication system is a business wireless system. In the business wireless system, mutually different identifiers are assigned to distinguish the plurality of wireless terminal devices from each other. The base station device calls the wireless terminal device by using the identifier or transmits a signal to the wireless terminal device. Therefore, even in the case in which a single user uses two wireless terminal devices for communication depending on the situation, different identifiers are assigned to the wireless terminal devices. This is because, when a plurality of wireless terminal devices to which the same identifier is assigned are located in a communication system, incongruity may occur in the communication system.

Meanwhile, there are situations in which it is desired that a common identifier is used for two wireless terminal devices used by a single user. For example, a policeman, a rescue team member (hereinafter, "user") may use a wireless terminal device mounted on a vehicle (hereinafter, "mobile wireless terminal device") and a wireless terminal device carried around the waist, etc. (hereinafter, "portable wireless terminal device") depending on the situation. Generally, the user uses the portable wireless terminal device away from the vehicle. When the user is inside or beside the vehicle, on the other hand, the user uses the mobile wireless terminal device to suppress the power consumption of the portable wireless terminal device that is driven by a battery. When different identifiers are assigned to the portable wireless terminal device and the mobile wireless terminal device in this situation, the user cannot respond when there is call designating the identifier of the mobile wireless terminal device while the user is away from the vehicle.

In order to share one identifier between the two wireless terminal devices, the identifier (hereinafter, "common identifier") is activated in the mobile wireless terminal device and the common identifier is inactivated in the portable wireless terminal device, when, for example, the mobile wireless terminal device and the portable wireless terminal device are located in the vehicle. When the portable wireless terminal device is located outside the vehicle, on the other hand, the common identifier is activated in the portable wireless terminal device, and the common identifier is inactivated in the mobile wireless terminal device. In this case, a unique identifier (hereinafter, "dedicated identifier") may be activated in the mobile wireless terminal device. This allows a further user who remains in the vehicle to communicate by using the mobile wireless terminal device.

When the further user is affected by an infectious disease, bacteria may be attached to the mobile wireless terminal device as the further user operates the mobile wireless terminal device. When the user carrying the portable wireless terminal device returns to the vehicle in this situation, communication using the portable wireless terminal device is disabled, and communication using the mobile wireless terminal device using the common identifier is enabled. When the user touches the mobile wireless terminal device for communication, bacteria are attached to the user's hand so that the user may be affected by the infectious disease.

The wireless communication system according to the embodiment is configured such that, when the further user touches the mobile wireless terminal device operated according to the dedicated identifier, the common identifier set in the portable wireless terminal device is maintained even when the user carrying the portable wireless terminal device returns to the vehicle. Therefore, the user does not use the mobile wireless terminal device and communicates by using the portable wireless terminal device.

FIGS. 1A-1D show an outline of the operation in a wireless communication system 1000. The wireless communication system 1000 shown in FIG. 1A includes a mobile wireless terminal device 200, a portable wireless terminal device 300, and a base station device (not shown). The mobile wireless terminal device 200 and the portable wireless terminal device 300 may be generically referred to as wireless terminal devices. The vehicle 100 is exemplified by an automobile such as a patrol car. A driver 110 and a communication personnel 120 get on the vehicle 100. The driver 110 and the communication personnel 120 are policemen. The driver 110 is mainly in charge of driving the vehicle 100, and the communication personnel 120 is mainly in charge of communication using the mobile wireless terminal device 200 and carries the portable wireless terminal device 300.

The mobile wireless terminal device 200 is a wireless terminal device mounted on the vehicle 100 and is operated by a power supplied from the battery mounted on the vehicle 100. Further, the mobile wireless terminal device 200 can perform business wireless communication. A publicly known technology may be used for business wireless communication so that a description thereof is omitted here. The mobile wireless terminal device 200 performs PushtoTalk (PTT) audio communication. In PTT, a talk is started as the button provided in the mobile wireless terminal device 200 is pushed by the communication personnel 120, and the talk is terminated as the button is released. When the button is not pushed, on the other hand, the communication personnel 120 merely listens to a message. In order to perform business wireless communication like this, an identifier is assigned to the mobile wireless terminal device 200. The mobile wireless terminal device 200 also performs wireless communication according to a wireless communication scheme different from business wireless communication. An example of such wireless communication is near-field wireless communication and radio beacon. Hereinafter, near-field wireless communication is assumed for clarity of the description.

The portable wireless terminal device 300 is a wireless terminal device that can be carried by the communication personnel 120 and is operated by a power supplied from the built-in battery. Generally, the capacity of the battery built in the portable wireless terminal device 300 is smaller than the capacity of the battery mounted on the vehicle 100. Like the mobile wireless terminal device 200, the portable wireless terminal device 300 can perform business wireless communication and performs PTT audio communication. In order to perform business wireless communication, an identifier is also assigned to the portable wireless terminal device 300. The mobile wireless terminal device 200 and the portable wireless terminal device 300 are wireless terminal devices linked to each other, and the identifiers used therein are identical. The identifier will be referred to as a "common identifier". By way of one example, the common identifier is "ID: 500". Further, like the mobile wireless terminal device 200, the portable wireless terminal device 300 also performs near-field wireless communication, which is a wireless communication scheme different from business wireless communication.

The base station device is compatible with business wireless communication. Further, the base station device is connected, at one end thereof, to the mobile wireless terminal device 200 and the portable wireless terminal device 300 according to the business wireless communication scheme. For this reason, when wireless terminal devices including the mobile wireless terminal device 200 and the portable wireless terminal device 300 are connected to the base station device, communication between the wireless terminal devices is performed via the base station device. The base station device allocates a downstream channel and an upstream channel to each wireless terminal device. When a channel is allocated, and when, in a preceding stage, a wireless terminal device is called, the aforementioned identifier (common identifier) is used. Further, the base station device is connected to a network (not shown) at the other end. A server and a communication device may be connected to this network.

Referring to FIG. 1A, the mobile wireless terminal device 200 and the portable wireless terminal device 300 are proximate to each other in the vehicle 100. When the mobile wireless terminal device 200 and the portable wireless terminal device 300 can communicate according to the near-field wireless communication scheme, the devices are described as being proximate. In this case, the mobile wireless terminal device 200 communicates with the base station device according to the business wireless communication scheme, and the portable wireless terminal device 300 does not communicate with the base station device. Therefore, the common identifier is activated in the mobile wireless terminal device 200, and the common identifier is inactivated in the portable wireless terminal device 300.

Figure 1B:
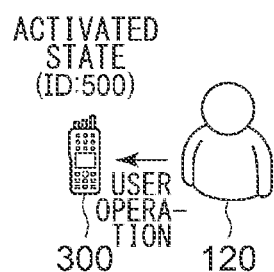
Figure 1B:
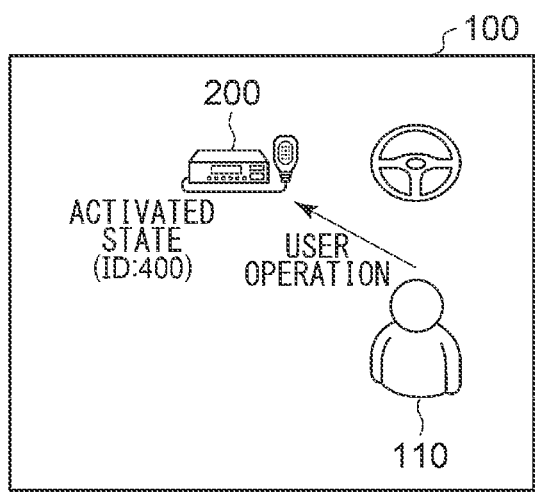

Referring to FIG. 1B, the vehicle 100 arrives at the neighborhood of a scene of an incident, and the communication personnel 120 carrying the portable wireless terminal device 300 gets off the vehicle 100 and moves to the scene. As a result, the mobile wireless terminal device 200 and the portable wireless terminal device 300 are distanced, and the mobile wireless terminal device 200 and the portable wireless terminal device 300 will not be proximate to each other. When the mobile wireless terminal device 200 and the portable wireless terminal device 300 cannot communicate according to the near-field wireless communication scheme, the devices are described as being not proximate. In this case, the portable wireless terminal device 300 communicates with the base station device according to the business wireless communication scheme by activating the common identifier. Meanwhile, the mobile wireless terminal device 200 communicates with the base station device according to the business wireless communication scheme by inactivating the common identifier but activating an identifier that can be used only by the mobile wireless terminal device 200 (hereinafter, "dedicated identifier"). By way of one example, the dedicated identifier is "ID: 400".

In this situation, the driver 110 operates the mobile wireless terminal device 200 to perform audio communication (originates a call) out of certain necessity. When operating the mobile wireless terminal device 200, the driver 110 touches the mobile wireless terminal device 200 so that bacteria from the driver 110 are attached to the mobile wireless terminal device 200 in the case the driver 110 has developed an infectious disease. When the mobile wireless terminal device 200 is operated while it is not proximate to the portable wireless terminal device 300, the mobile wireless terminal device 200 records that the operation has been performed. This is equivalent to setting a touch parameter to "touched". This is because the operation performed when the portable wireless terminal device 300 is not proximate is considered to be an operation performed by a user other than the communication personnel 120, who is the user of the portable wireless terminal device 300.

Figure 1C:
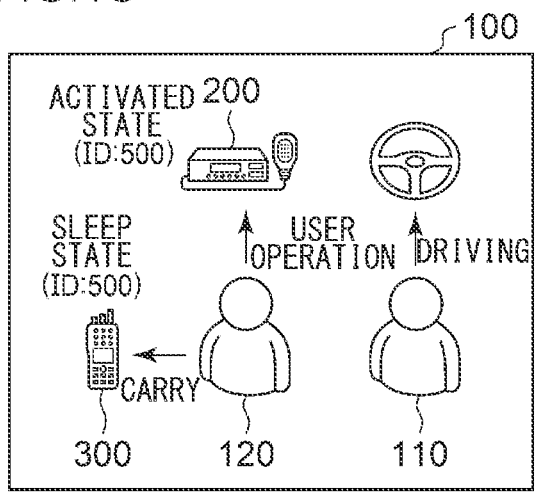

FIG. 1C shows an example of the situation following that of FIG. 1B. The communication personnel 120 returns from the scene and gets on the vehicle 100 again. In association with this, the mobile wireless terminal device 200 and the portable wireless terminal device 300 become proximate to each other. When in proximity with the portable wireless terminal device 300, the mobile wireless terminal device 200 transmits the touch parameter to the portable wireless terminal device 300 according to the near-field wireless communication scheme. When the touch parameter indicates "not touched", the mobile wireless terminal device 200 communicates with the base station device according to the business wireless communication scheme by activating the common identifier. The portable wireless terminal device 300 no longer communicates with the base station device according to the business wireless communication scheme by inactivating the common identifier. In other words, the situation is returned to that of FIG. 1A. In this situation, the communication personnel 120 performs audio communication (originates a call) by operating the mobile wireless terminal device 200. In that process, the communication personnel 120 touches the mobile wireless terminal device 200 touched by the driver 110.

Referring to FIG. 1A, when the driver 110 does not touch the mobile wireless terminal device 200, bacteria from the driver 110 are not attached to the mobile wireless terminal device 200 even if the driver 110 has developed an infectious disease. Therefore, bacteria are not attached to the communication personnel 120 even if the communication personnel 120 touches the mobile wireless terminal device 200. Consequently, it is not so likely that the driver 110 is affected by an infectious disease.

Figure 1D:
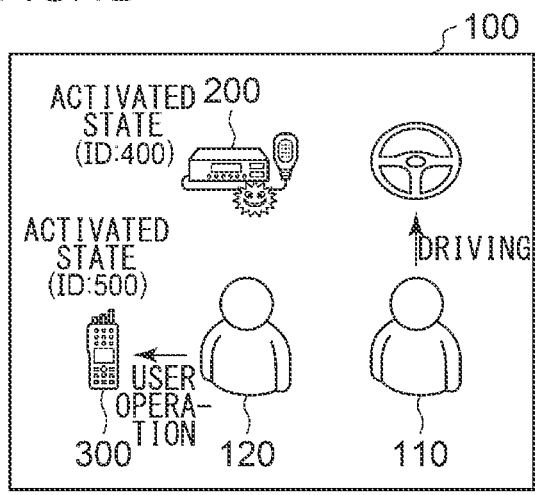

When the driver 110 has developed an infectious disease, on the other hand, bacteria may be attached to the communication personnel 120, who may be affected by the infectious disease. To inhibit contagion, the process of FIG. 1D is performed. FIG. 1D shows an example of an alternative process following that of FIG. 1B. Referring to FIG. 1D, the communication personnel 120 returns, as in the case of FIG. 1C, from the scene and gets on the vehicle 100 again. In association with this, the mobile wireless terminal device 200 and the portable wireless terminal device 300 become proximate to each other. When in proximity with the portable wireless terminal device 300, the mobile wireless terminal device 200 transmits the touch parameter to the portable wireless terminal device 300 according to the near-field wireless communication scheme. When the touch parameter indicates "touched", the mobile wireless terminal device 200 communicates with the base station device according to the business wireless communication scheme, maintaining the setting that activates the dedicated identifier. Meanwhile, the portable wireless terminal device 300 communicates with the base station device according to the business wireless communication scheme, maintaining the setting that activates the common identifier. In this case, the communication personnel 120 can communicate according to the business wireless communication scheme without touching the mobile wireless terminal device 200 touched by the driver 110. As a result, the likelihood of the driver 110 being affected by the infectious disease can be reduced.

Figure 2:
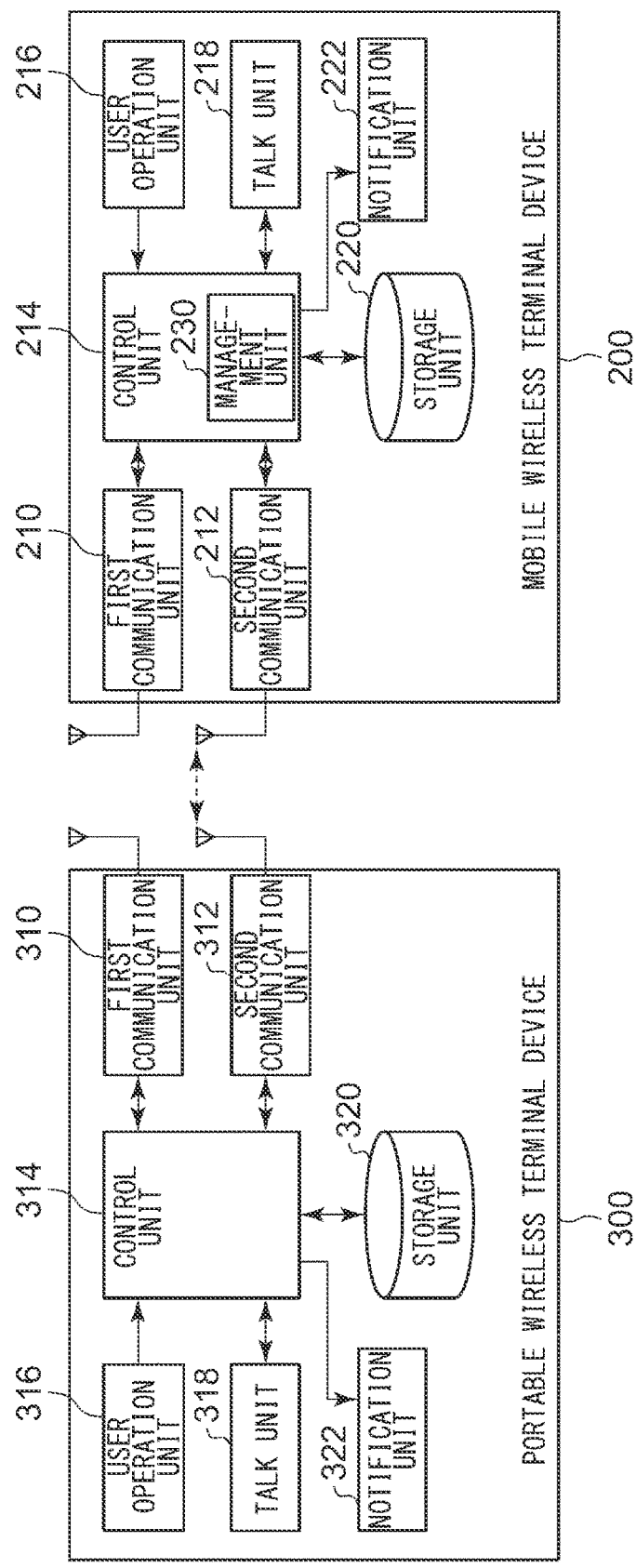
FIG. 2 shows configurations of the mobile wireless terminal device and the portable wireless terminal device of FIGS. 1A-1D.

FIG. 2 shows configurations of the mobile wireless terminal device 200 and the portable wireless terminal device 300. The mobile wireless terminal device 200 includes a first communication unit 210, a second communication unit 212, a control unit 214, a user operation unit 216, a talk unit 218, a storage unit 220, and a notification unit 222. The control unit 214 includes a management unit 230. The portable wireless terminal device 300 includes a first communication unit 310, a second communication unit 312, a control unit 314, a user operation unit 316, a talk unit 318, a storage unit 320, and a notification unit 333.

The first communication unit 210 and the first communication unit 310 perform communication according to the business wireless communication scheme. Therefore, the first communication unit 210 and the first communication unit 310 can communicate with a communication device (not shown) via the base station device. As mentioned above, an identifier for identifying a wireless terminal device is used in business wireless communication. In particular, one of the common identifier and the dedicated identifier is selectively set as the identifier in the first communication unit 210, and the common identifier is set as the identifier in the first communication unit 310.

The second communication unit 212 and the second communication unit 312 perform near-field wireless communication different from business wireless communication (e.g., Bluetooth (registered trademark) communication). Therefore, the second communication unit 212 directly communicates with the second communication unit 312 without being mediated by the base station device, and the second communication unit 312 communicates with the second communication unit 212 without being mediate by the base station device. Given that business wireless communication represents long-distance wireless communication, it can be said that near-field wireless communication is short-distance wireless communication. Given that business wireless communication represents the first wireless communication scheme, it can be said that near-field wireless communication is the second wireless communication scheme. A publicly known technology may be used for business wireless communication and near-field wireless communication, and a description thereof is omitted. The second communication unit 212 may us radio beacon in place of near-field wireless communication. In this case, the distance that a radio beacon can be transmitted is configured to be shorter than the distance of transmission in business wireless communication and is similar to the distance of transmission of near-field wireless communication.

In near-field wireless communication, mutually different identifiers (hereinafter, "near-field identifiers") are assigned in order to distinguish a plurality of wireless terminal devices 20 from each other. The near-field identifiers can be said to be assigned to the plurality of wireless terminal devices 20 independently. When transmitting a signal, the second communication unit 212 includes the near-field identifier assigned to the mobile wireless terminal device 200 in the signal. Further, the second communication unit 212 receives a signal including the near-field identifier assigned to the portable wireless terminal device 300 originating the signal. The second communication unit 212 outputs the received signal to the control unit 214 and receives a signal that should be transmitted from the control unit 214. The second communication unit 312 and the control unit 314 perform processes similar to those of the second communication unit 212 and the control unit 214.

The storage unit 220 of the mobile wireless terminal device 200 stores the common identifier, the dedicated identifier, and the near-field identifier for the mobile wireless terminal device 200 and also stores the near-field identifier assigned to the portable wireless terminal device 300. FIGS. 3A-3B show data structures of databases stored in the storage unit 220 and the storage unit 320. FIG. 3A shows a data structure of a database stored in the storage unit 220. The database stores the common identifier "500", the dedicated identifier "400", and the near-field identifier "10" assigned to the mobile wireless terminal device 200. The database also stores the near-field identifier "20" assigned to the portable wireless terminal device 300 as "registered near-field identifier". FIG. 3B will be described later, and reference is made back to FIG. 2.

The user operation unit 216 is provided with, for example, a button for PTT, a button for changing the setting of received frequency, sound volume, etc. in the mobile wireless terminal device. The user operation unit 216 outputs an instruction for transmission to the control unit 214 while the button for PTT is being pushed. When an instruction for transmission from the user operation unit 216 is received, the control unit 214 causes the first communication unit 210 to transmit a signal. When an instruction from the user operation unit 216 is not received, the control unit 214 causes the first communication unit 210 to receive a signal. It will be assumed here that audio communication according to PTT is performed in the first communication unit 210. Therefore, the signal transmitted from the first communication unit 210 includes an audio signal received by the microphone provided in the talk unit 218. Meanwhile, the signal received by the first communication unit 210 includes an audio signal that should be output from the speaker provided in the talk unit 218.

When the second communication unit 212 makes a transition from a state of communication with the second communication unit 312 of the portable wireless terminal device 300 to a state of non-communication and then the user operation unit 216 is operated, the management unit 230 sets the touch parameter to "touched". The touch parameter is a parameter indicating whether a user such as the driver 110 other than the user of the portable wireless terminal device 300 has touched the mobile wireless terminal device 200. The mobile wireless terminal device 200 may have a fingerprint storage function, a fingerprint acquisition function, and a fingerprint verification function, and a touch parameter may be set in accordance with a result of fingerprint verification. For example, the mobile wireless terminal device 200 may store the fingerprint of the user of the portable wireless terminal device 300 in advance. When the mobile wireless terminal device 200 is operated by a finger, the mobile wireless terminal device 200 acquires the fingerprint, checks whether or not the acquired fingerprint matches the pre-stored fingerprint. If a mismatch is found, the mobile wireless terminal device 200 determines that a user other than the user of the portable wireless terminal device 300 has touched the mobile wireless terminal device 200 and sets the touch parameter to "touched".

The control unit 214 controls the operation of the mobile wireless terminal device 200. When the first communication unit 210 can communicate with the second communication unit 312 of the portable wireless terminal device 300, and when the touch parameter managed by the management unit 230 does not indicate "touched", the control unit 214 causes the first communication unit 210 to use the common identifier. This is equivalent to, for example, the processes in FIG. 1A and FIG. 1C. When the first communication unit 210 is not communicating with the second communication unit 312 of the portable wireless terminal device 300, the control unit 214 causes the first communication unit 210 to use the dedicated identifier. This is equivalent to, for example, the process in FIG. 1B. When the first communication unit 210 can communicate with the second communication unit 312 of the portable wireless terminal device 300, and when the touch parameter managed by the management unit 230 indicates "touched", the control unit 214 causes the first communication unit 210 to use the dedicated identifier. This is equivalent to, for example, the process in FIG. 1D.

When the touch parameter managed by the management unit 230 indicates "touched", the control unit 214 causes the notification unit 222 to output a notification. The notification unit 222 is exemplified by a display or a speaker. The notification indicates that the mobile wireless terminal device 200 has been operated by another person.

The storage unit 320 of the portable wireless terminal device 300 stores the near-field identifier assigned to the mobile wireless terminal device 200 as well as storing the common identifier and the near-field identifier for the portable wireless terminal device 300. FIG. 3B shows a data structure of a database stored in the storage unit 320. The database stores the common identifier "500" and the near-field identifier "20" assigned to the portable wireless terminal device 300 and also stores the near-field identifier "10" assigned to the mobile wireless terminal device 200 as "registered near-field identifier". Reference is made back to FIG. 2. The user operation unit 316 is configured in a manner similar to that of the user operation unit 216, but a touch parameter is not set by the user operation in the user operation unit 316.

When the second communication unit 312 can communicate with the second communication unit 212 of the mobile wireless terminal device 200, the second communication unit 312 receives the touch parameter from the second communication unit 212. When the control unit 314 does not indicate "touched", the control unit 314 suspends the operation of the first communication unit 310. This is equivalent to, for example, the processes in FIG. 1A and FIG. 1C. When the second communication unit 312 is not communicating with the second communication unit 212 of the mobile wireless terminal device 200, the control unit 314 activates the first communication unit 310 by causing the first communication unit 310 to use the common identifier. This is equivalent to, for example, the process in FIG. 1B. When the second communication unit 312 can communicate with the second communication unit 212 of the mobile wireless terminal device 200, and when the touch parameter received from the mobile wireless terminal device 200 indicates "touched", the control unit 314 activates the first communication unit 310 by causing the first communication unit 310 to use the common identifier. This is equivalent to the process in FIG. 1D.

When the touch parameter received from the mobile wireless terminal device 200 indicates "touched", the control unit 314 causes the notification unit 322 to output a notification. The notification unit 322 is exemplified by a display or a speaker. The notification indicates that the mobile wireless terminal device 200 has been operated by another person.

The features are implemented in hardware such as a CPU, a memory, or other LSIs of an arbitrary computer and in software such as a program loaded into a memory. The figure depicts functional blocks implemented by the cooperation of these elements. Therefore, it will be understood by those skilled in the art that the functional blocks may be implemented in a variety of manners by hardware only, software only, or by a combination of hardware and software.

Figure 4:
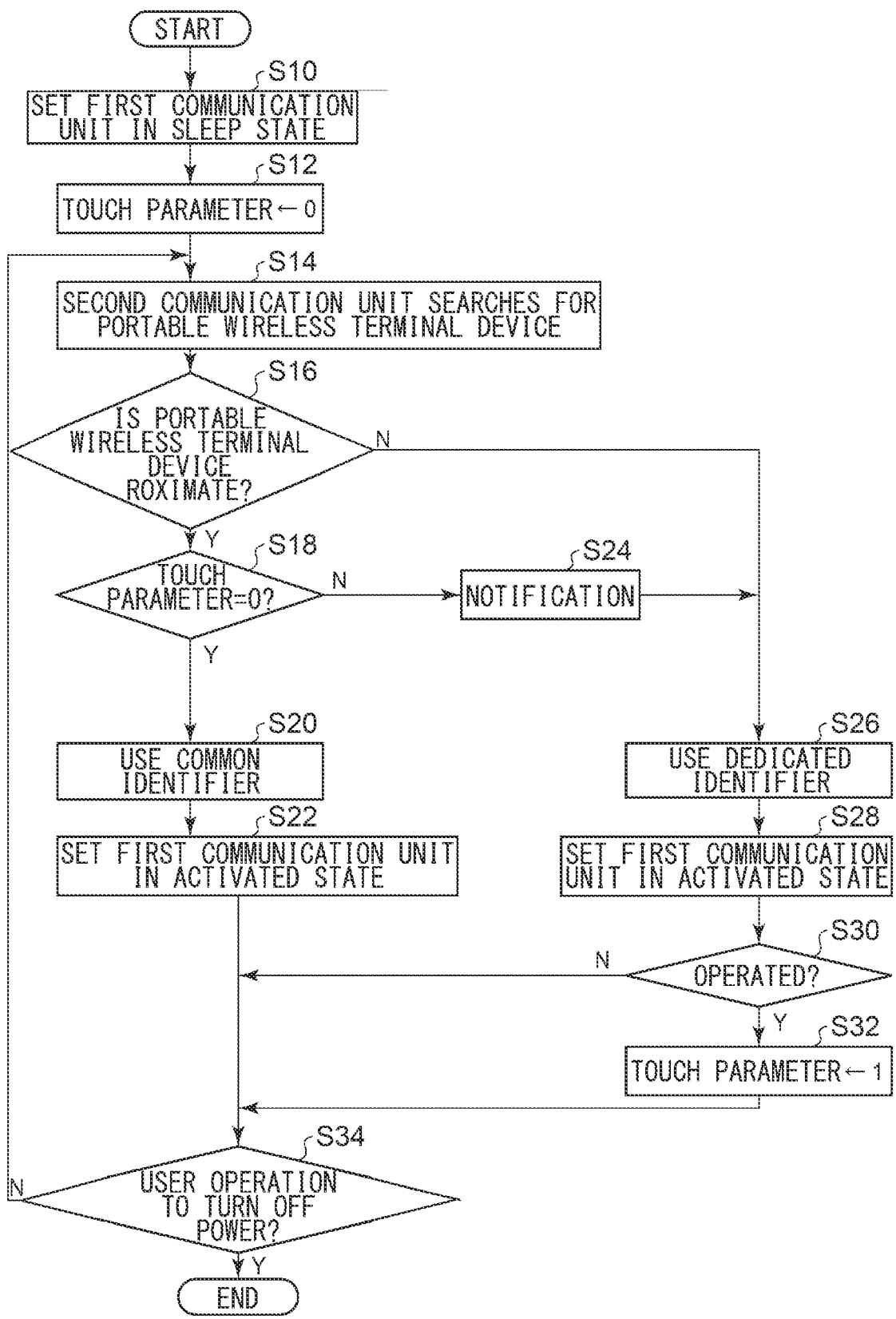
FIG. 4 is a flowchart showing a sequence of steps performed by the mobile wireless terminal device of FIG. 2.

A description will now be given of the operation of the wireless communication system 1000 having the above-described configuration. FIG. 4 is a flowchart showing a sequence of steps performed by the mobile wireless terminal device 200. The control unit 214 sets the first communication unit 210 in a sleep state (S10). The management unit 230 sets the touch parameter to "0" indicating "not touched" (S12). The second communication unit 212 searches for the portable wireless terminal device 300 (S14). When the portable wireless terminal device 300 is proximate (Y in S16), and when the touch parameter is "0" (Y in S18), the control unit 214 causes the first communication unit 210 to use the common identifier (S20) and sets the first communication unit 210 in an activated state (S22).

When the touch parameter is not "0" (N in S18), the notification unit 222 performs notification (S24). The control unit 214 causes the first communication unit 210 to use the dedicated identifier (S26) and sets the first communication unit 210 in an activated state (S28). When the portable wireless terminal device 300 is not proximate (N in S16), the control unit 214 causes the first communication unit 210 to use the dedicated identifier (S26) and sets the first communication unit 210 in an activated state (S28). When the mobile wireless terminal device 200 is operated (Y in S30), the management unit 230 sets the touch parameter to "1" indicating "touched" (S32). When the mobile wireless terminal device 200 is not operated (N in S30), step 32 is skipped. When a user operation to turn off the power is not performed (N in S34), control is returned to step S14. When a user operation to turn off the power is performed (Y in S34), the process is terminated.

Figure 5:
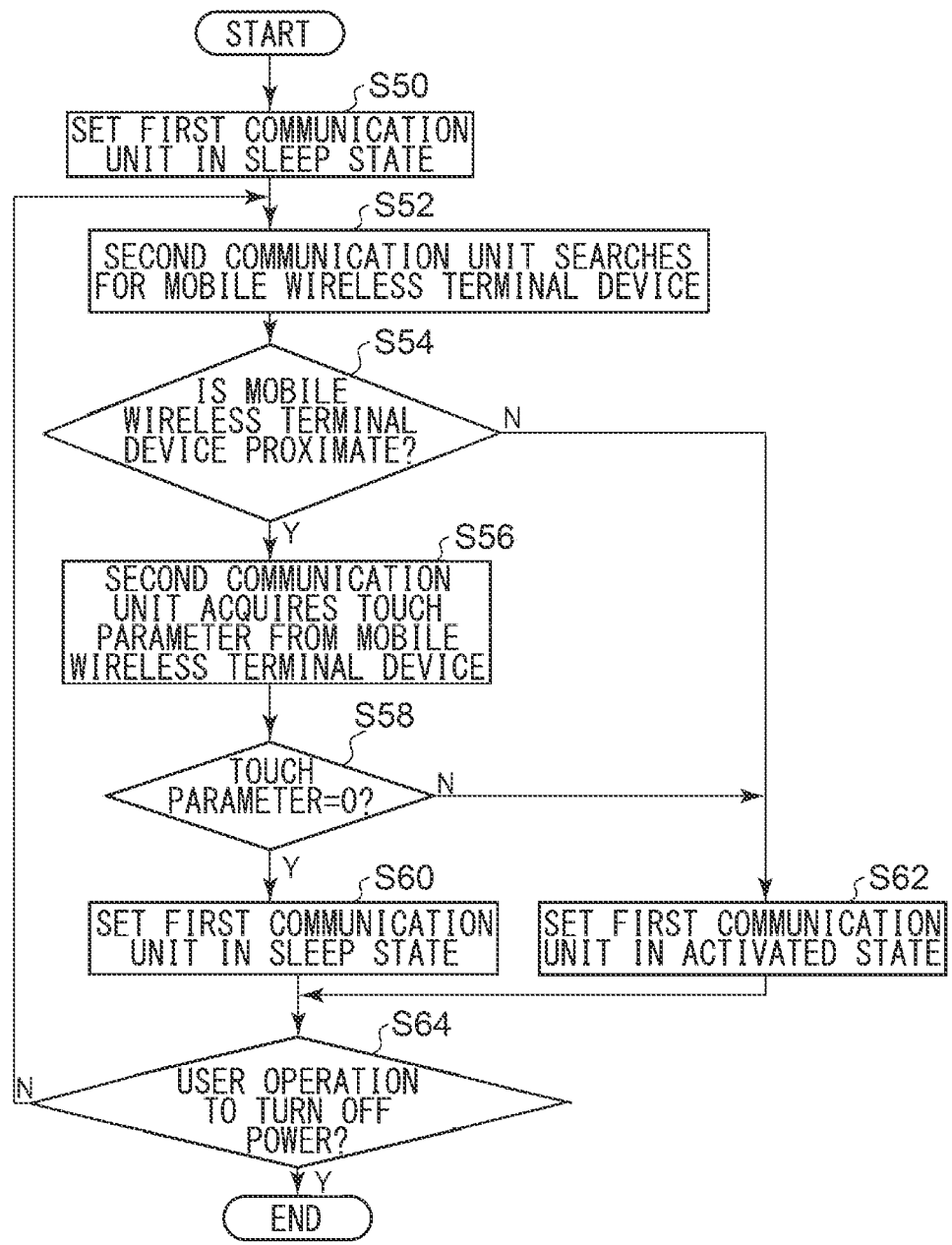
FIG. 5 is a flowchart showing a sequence of steps performed by the portable wireless terminal device of FIG. 2.

FIG. 5 is a flowchart showing a sequence of steps performed by the portable wireless terminal device 300. The control unit 314 sets the first communication unit 310 in a sleep state (S50). The second communication unit 312 searches for the mobile wireless terminal device 200 (S52). When the mobile wireless terminal device 200 is proximate (Y in S54), the second communication unit 312 acquires the touch parameter from the mobile wireless terminal device (S56). When the touch parameter is "0" (Y in S58), the control unit 314 sets the first communication unit 310 in a sleep state (S60). When the mobile wireless terminal device 200 is not proximate (N in S54), or when the touch parameter is not "0" (N in S58), the control unit 314 sets the first communication unit 310 in an activated state (S62). When a user operation to turn off the power is not performed (N in S64), control is returned to step S52. When a user operation to turn off the power is performed (Y in S64), the process is terminated.

According to this embodiment, when the touch parameter does not indicate "touched" in the case communication with the portable wireless terminal is enabled, the common identifier is used for wireless communication according to the business wireless communication scheme so that the mobile wireless terminal device can be used when the portable wireless terminal device is proximate. Further, when the touch parameter indicates "touched" in the case communication with the portable wireless terminal device is enabled, the dedicated identifier is used for wireless communication according to the business wireless communication scheme so that contagion of an infectious disease can be inhibited. Further, a notification is output when the touch parameter indicates "touched" so that the likelihood of contagion of an infectious disease can be communicated.

Further, when the touch parameter received from the mobile wireless terminal device does not indicate "touched" in the case communication with the mobile wireless terminal is enabled, business wireless communication is suspended so that the mobile wireless terminal device can be used when the mobile wireless terminal device is proximate. Further, when the touch parameter received from the mobile wireless terminal device indicates "touched" in the case communication with the mobile wireless terminal device is enabled, business wireless communication is activated so that contagion of an infectious disease can be inhibited. Further, a notification is output when the touch parameter received from the mobile wireless terminal device indicates "touched" so that the likelihood of contagion of an infectious disease can be communicated.

Embodiment 2

A description will now be given of embodiment 2. Like embodiment 1, embodiment 2 relates to a wireless communication system formed by a plurality of wireless terminal devices and a base station device, in which communication is performed via the base station device. In embodiment 1, when the mobile wireless terminal device and the portable wireless terminal device become proximate to each other after the mobile wireless terminal device is operated while the mobile wireless terminal device and the portable wireless terminal device are not proximate to each other, both the mobile wireless terminal device and the portable wireless terminal device can communicate. In embodiment 2, on the other hand, the mobile wireless terminal device is disabled to communicate, and the portable wireless terminal device is enabled to communicate in the state described immediately above. The mobile wireless terminal device 200 and the portable wireless terminal device 300 according to embodiment 2 are of the same type as that of FIG. 2. The description below highlights a difference from the foregoing embodiment.

Figure 6A:
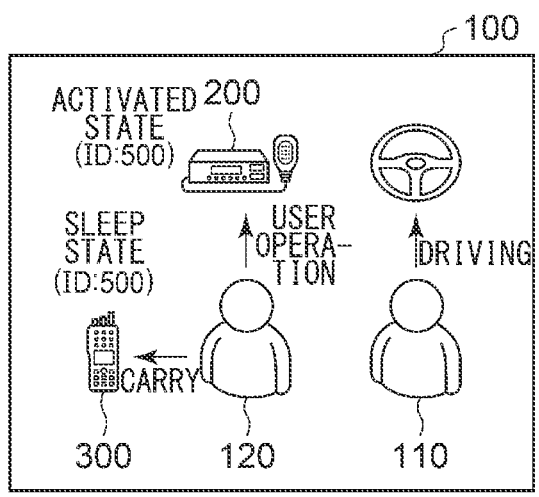
FIGS. 6A-6D show an outline of the operation in a wireless communication system according to embodiment 2.
Figure 6B:
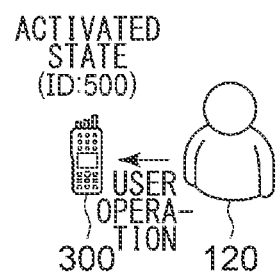
Figure 6B:
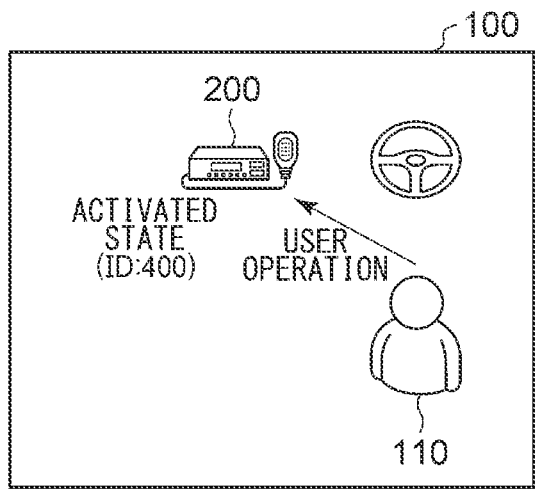
Figure 6C:
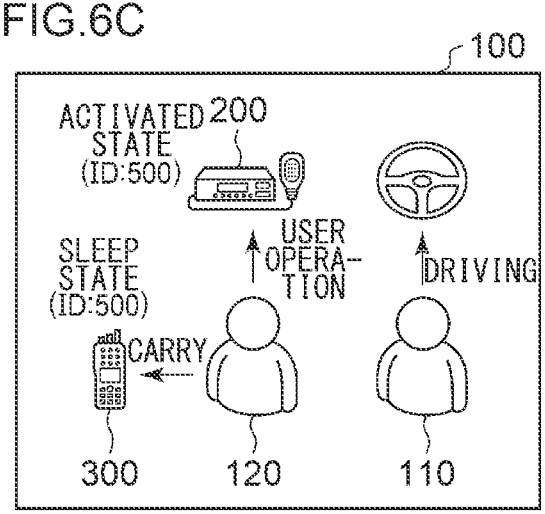
Figure 6D:
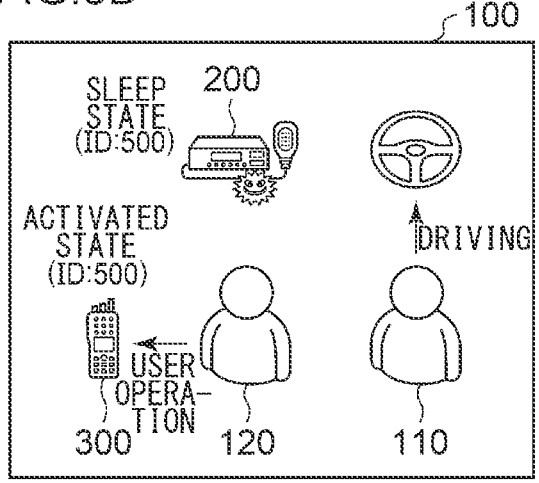

FIGS. 6A-6D show an outline of the operation in a wireless communication system 1000. FIGS. 6A-6C are identical to FIGS. 1A-1C so that a description thereof is omitted. FIG. 6D shows an example of an alternative process following that of FIG. 6B. In FIG. 6D, as in FIG. 6C, the communication personnel 120 returns from the scene and gets on the vehicle 100 again. In association with this, the mobile wireless terminal device 200 and the portable wireless terminal device 300 become proximate to each other. When in proximity with the portable wireless terminal device 300, the mobile wireless terminal device 200 transmits the touch parameter to the portable wireless terminal device 300 according to the near-field wireless communication scheme. When the touch parameter indicates "touched", the mobile wireless terminal device 200 suspends communication with the base station device according to the business wireless communication scheme. Meanwhile, the portable wireless terminal device 300 communicates with the base station device according to the business wireless communication scheme, maintaining the setting whereby the common identifier is active.

When the first communication unit 210 can communicate with the second communication unit 312 of the portable wireless terminal device 300, and when the touch parameter managed by the management unit 230 does not indicate "touched", the control unit 214 of the mobile wireless terminal device 200 of FIG. 2 causes the first communication unit 210 to use the common identifier. This is equivalent to, for example, the processes in FIG. 6A and FIG. 6C. When the first communication unit 210 is not communicating with the second communication unit 312 of the portable wireless terminal device 300, the control unit 214 causes the first communication unit 210 to use the dedicated identifier. This is equivalent to, for example, the process in FIG. 6B. When the first communication unit 210 can communicate with the second communication unit 312 of the portable wireless terminal device 300, and when the touch parameter managed by the management unit 230 indicates "touched", the control unit 214 suspends the operation of the first communication unit 210. This is equivalent to, for example, the process in FIG. 6D. In that process, the control unit 214 causes the notification unit 222 to output a notification.

Figure 7:
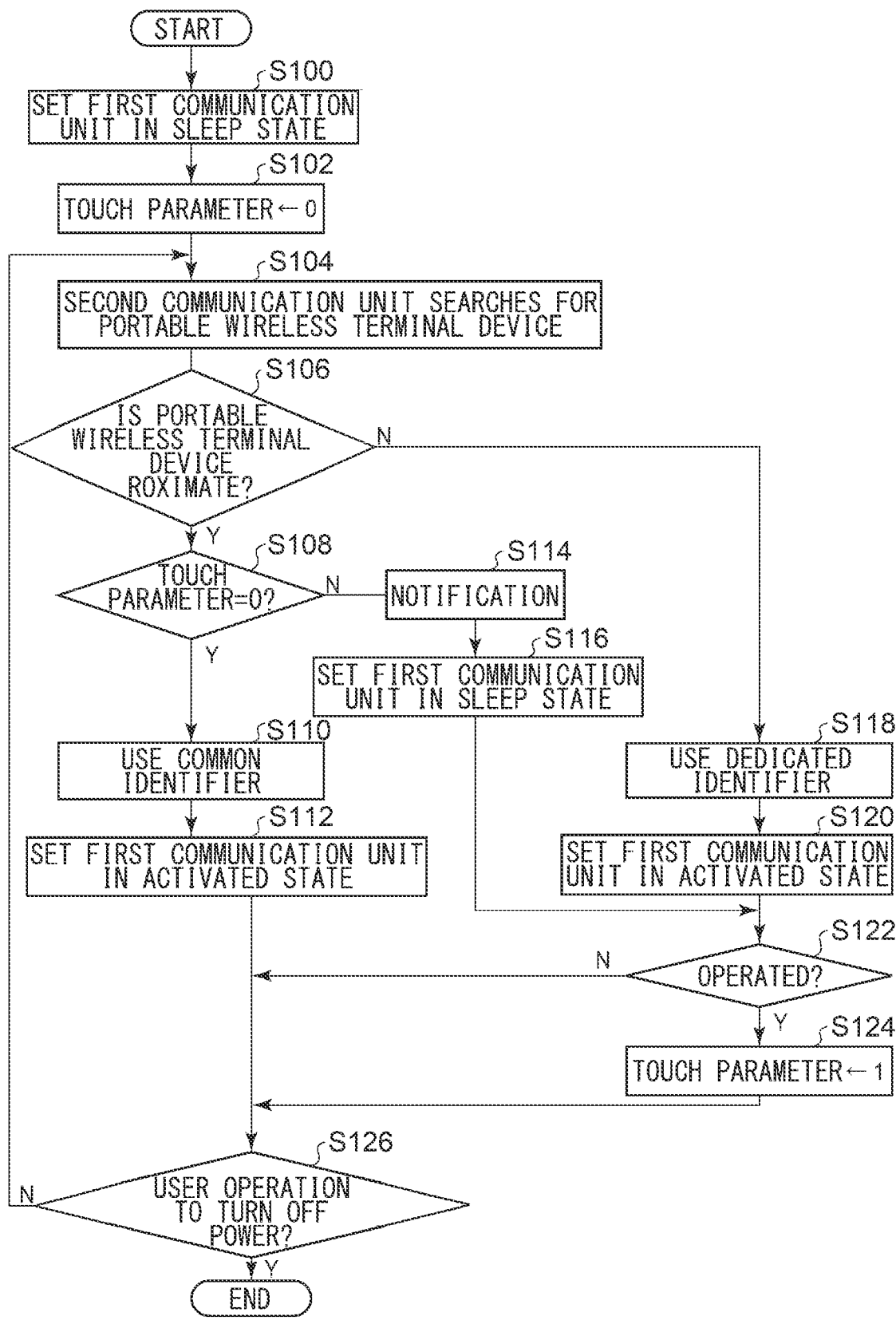
FIG. 7 is a flowchart showing a sequence of steps performed by the mobile wireless terminal device according to embodiment 2.

A description will now be given of the operation of the wireless communication system 1000 having the above-described configuration. FIG. 7 is a flowchart showing a sequence of steps performed by the mobile wireless terminal device 200. The control unit 214 sets the first communication unit 210 in a sleep state (S100). The management unit 230 sets the touch parameter to "0" indicating "not touched" (S102). The second communication unit 212 searches for the portable wireless terminal device 300 (S104). When the portable wireless terminal device 300 is proximate (Y in S106), and when the touch parameter is "0" (Y in S108), the control unit 214 causes the first communication unit 210 to use the common identifier (S110) and sets the first communication unit 210 in an activated state (S112).

When the touch parameter is not "0" (N in S108), the notification unit 222 performs notification (S114). The control unit 214 sets the first communication unit 210 in a sleep state (S116). When the portable wireless terminal device 300 is not proximate (N in S106), the control unit 214 causes the first communication unit 210 to use the dedicated identifier (S118) and sets the first communication unit 210 in an activated state (S120). When the mobile wireless terminal device 200 is operated (Y in S122), the management unit 230 sets the touch parameter to "1" indicating "touched" (S124). When the mobile wireless terminal device 200 is not operated (N in S122), step 124 is skipped. When a user operation to turn off the power is not performed (N in S126), control is returned to step S104. When a user operation to turn off the power is performed (Y in S126), the process is terminated.

According to this embodiment, when the touch parameter does not indicate "touched" in the case communication with the portable wireless terminal is enabled, business wireless communication is performed so that the mobile wireless terminal device can be used when the portable wireless terminal device is proximate. Further, when the touch parameter indicates "touched" in the case communication with the portable wireless terminal device is enabled, business wireless communication is suspended so that contagion of an infectious disease can be inhibited. Further, the touch parameter is set when a touch by the user is sensed so that the touch can be reflected in the touch parameter. Further, when the touch parameter received from the mobile wireless terminal device indicates "touched" in the case communication with the mobile wireless terminal device is enabled, business wireless communication is activated so that contagion of an infectious disease can be inhibited.

Embodiment 3

A description will now be given of embodiment 3. Like the foregoing embodiments, embodiment 3 relates to a wireless communication system formed by a plurality of wireless terminal devices and a base station device, in which communication is performed via the base station device. In embodiment 1, when the mobile wireless terminal device and the portable wireless terminal device become proximate to each other after the mobile wireless terminal device is operated while the mobile wireless terminal device and the portable wireless terminal device are not proximate to each other, both the mobile wireless terminal device and the portable wireless terminal device can communicate. In embodiment 3, on the other hand, the portable wireless terminal device suspends business wireless communication, and the mobile wireless terminal device activates business wireless communication, in the state described immediately above. Further, the portable wireless terminal device uses near-field wireless communication to operate as a headphone microphone with PTT for the mobile wireless terminal device. The mobile wireless terminal device 200 and the portable wireless terminal device 300 according to embodiment 3 are of the same type as that of FIG. 2. The description below highlights a difference from the foregoing embodiment.

Figure 8A:
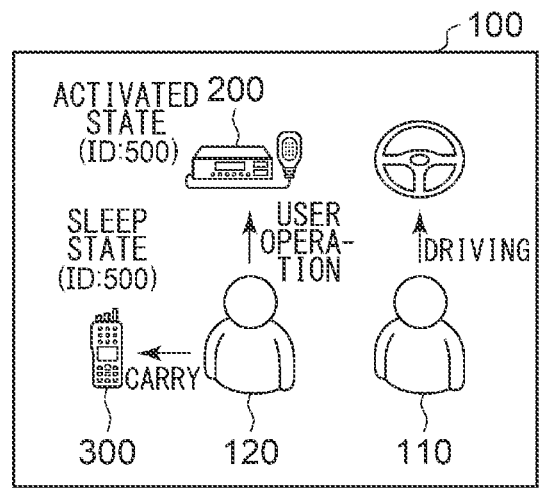
FIGS. 8A-8D show an outline of the operation in a wireless communication system according to embodiment 3.
Figure 8B:
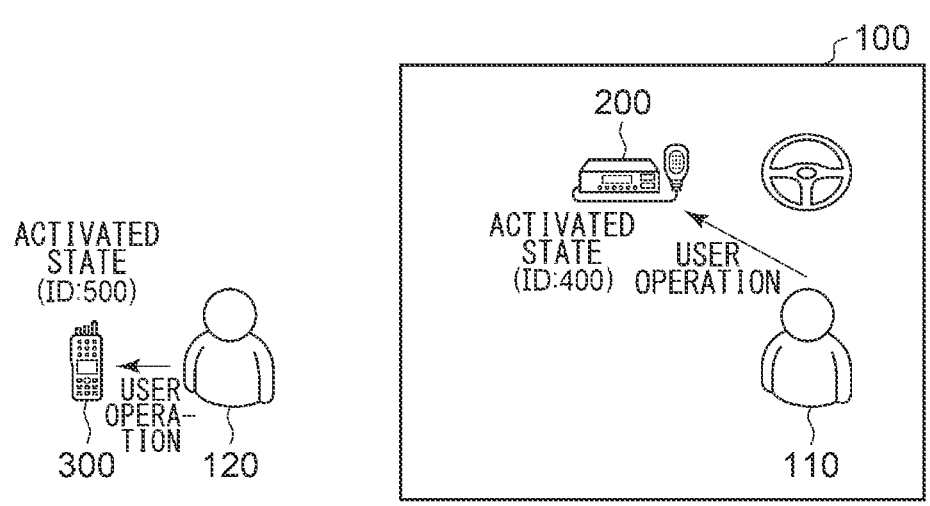
Figure 8C:
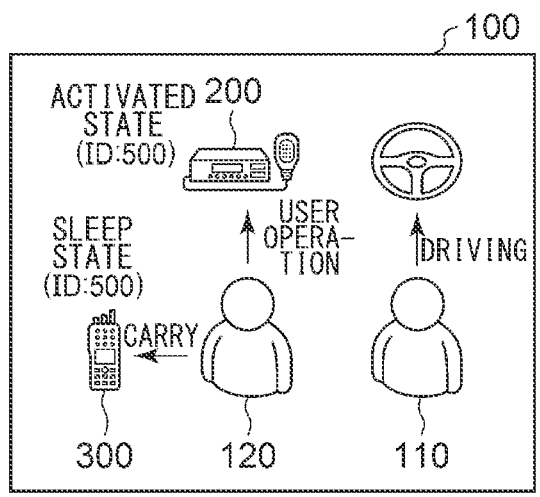
Figure 8D:
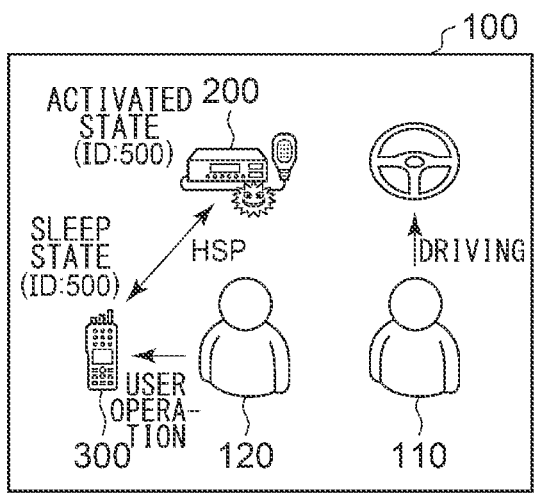

FIGS. 8A-8D show an outline of the operation in a wireless communication system 1000. FIGS. 8A-8C are identical to FIGS. 1A-1C so that a description thereof is omitted. FIG. 8D shows an example of an alternative process following that of FIG. 8B. In FIG. 8D, as in FIG. 8C, the communication personnel 120 returns from the scene and gets on the vehicle 100 again. In association with this, the mobile wireless terminal device 200 and the portable wireless terminal device 300 become proximate to each other. When in proximity with the portable wireless terminal device 300, the mobile wireless terminal device 200 transmits the touch parameter to the portable wireless terminal device 300 according to the near-field wireless communication scheme. When the touch parameter indicates "touched", the mobile wireless terminal device 200 communicates with the base station according to the business wireless communication scheme by activating the common identifier. The portable wireless terminal device 300 no longer communicates with the base station device according to the business wireless communication scheme by inactivating the common identifier.

However, i) audio communication using, for example, the HeadSetProfile (HSP) for near-field wireless communication or ii) headset PTT communication performed according to information on push or release of the PTT button of the portable wireless terminal device 300 is performed between the portable wireless terminal device 300 and the mobile wireless terminal device 200. In other words, the portable wireless terminal device 300 is connected to the mobile wireless terminal device 200, which performs communication according to the business wireless communication scheme, according to the near-field wireless communication scheme. This causes the communication personnel 120 to communicate with the base station device via the mobile wireless terminal device 200 by using the user operation unit 216 and the talk unit 218 of the portable wireless terminal device 300.

When the second communication unit 212 can communicate with the second communication unit 312 of the portable wireless terminal device 300, and when the touch parameter managed by the management unit 230 does not indicate "touched", the control unit 214 of the mobile wireless terminal device 200 of FIG. 2 causes the first communication unit 210 to use the common identifier. Further, the control unit 214 suspends headset PTT communication of the second communication unit 212. This is equivalent to, for example, the processes in FIG. 8A and FIG. 8C.

When the second communication unit 212 is not communicating with the second communication unit 312 of the portable wireless terminal device 300, the control unit 214 causes the first communication unit 210 to use the dedicated identifier. Further, the control unit 214 suspends headset PTT communication of the second communication unit 212. This is equivalent to, for example, the process in FIG. 8B.

When the second communication unit 212 can communicate with the second communication unit 312 of the portable wireless terminal device 300, and when the touch parameter managed by the management unit 230 indicates "touched", the control unit 214 causes the first communication unit 210 to use the common identifier. Further, the control unit 214 activates headset PTT communication of the second communication unit 212. This is equivalent to, for example, the process in FIG. 8D. In that process, the control unit 214 causes the notification unit 222 to output a notification.

When the second communication unit 312 of the portable wireless terminal device 300 can communicate with the second communication unit 212 of the mobile wireless terminal device 200, the second communication unit 312 receives the touch parameter from the second communication unit 212. When the touch parameter received does not indicate "touched", the control unit 314 suspends the operation of the first communication unit 310. Further, the control unit 314 suspends headset PTT communication of the second communication unit 312. This is equivalent to, for example, the processes in FIG. 8A and FIG. 8C.

When the second communication unit 312 can communicate with the second communication unit 212 of the mobile wireless terminal device 200, and when the touch parameter received from the mobile wireless terminal device 200 indicates "touched", the control unit 314 suspends the operation of the first communication unit 310. Further, the control unit 314 activates headset PTT communication of the second communication unit 312. This is equivalent to, for example, the process in FIG. 8D. When the touch parameter received from the mobile wireless terminal device 200 indicates "touched", the control unit 314 causes the notification unit 322 to output a notification.

When the second communication unit 312 is not communicating with the second communication unit 212 of the mobile wireless terminal device 200, the control unit 314 activates the first communication unit 310 by causing the first communication unit 310 to use the common identifier. Further, the control unit 314 suspends headset PTT communication of the second communication unit 312. This is equivalent to, for example, the process in FIG. 8B.

Figure 9:
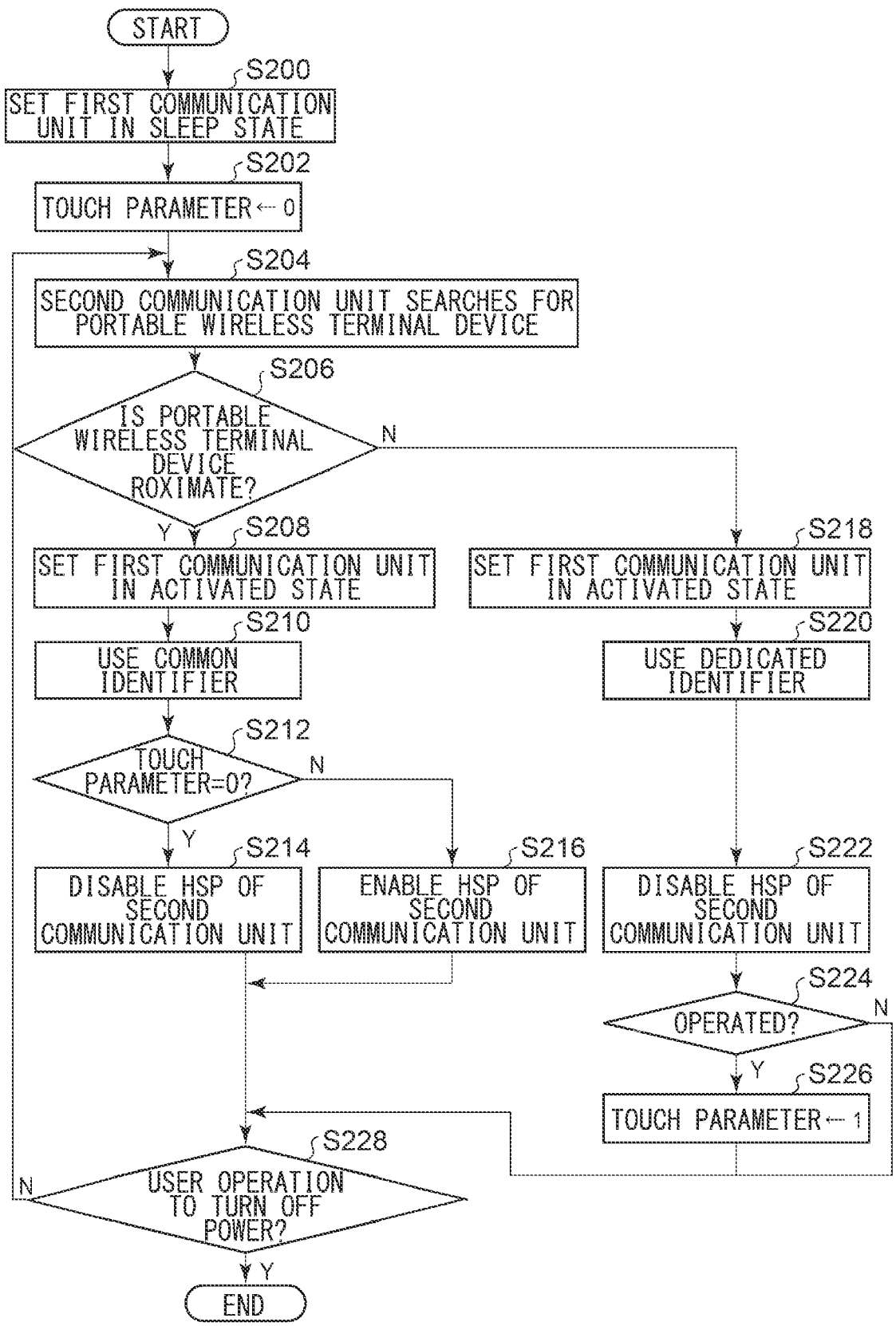
FIG. 9 is a flowchart showing a sequence of steps performed by the mobile wireless terminal device according to embodiment 3.

A description will now be given of the operation of the wireless communication system 1000 having the above-described configuration. FIG. 9 is a flowchart showing a sequence of steps performed by the mobile wireless terminal device 200. The control unit 214 sets the first communication unit 210 in a sleep state (S200). The management unit 230 sets the touch parameter to "0" indicating "not touched" (S202). The second communication unit 212 searches for the portable wireless terminal device 300 (S204). When the portable wireless terminal device 300 is proximate (Y in S206), the control unit 214 sets the first communication unit 210 in an activated state (S208) and causes the first communication unit 210 to use the common identifier (S210). When the touch parameter is "0" (Y in S212), the control unit 214 sets the second communication unit 212 in a disabled HSP state (S214). When the touch parameter is not "0" (N in S212), the control unit 214 sets the second communication unit 212 in an enabled HSP state (S216).

When the portable wireless terminal device 300 is not proximate (N in S206), the control unit 214 sets the first communication unit 210 in an activated state (S218) and causes the first communication unit 210 to use the dedicated identifier (S220). The control unit 214 sets the second communication unit 212 in a disabled HSP state (S222). When the mobile wireless terminal device 200 is operated (Y in S224), the management unit 230 sets the touch parameter to "1" indicating "touched" (S226). When the mobile wireless terminal device 200 is not operated (N in S224), step 226 is skipped. When a user operation to turn off the power is not performed (N in S228), control is returned to step S204. When a user operation to turn off the power is performed (Y in S228), the process is terminated.

Figure 10:
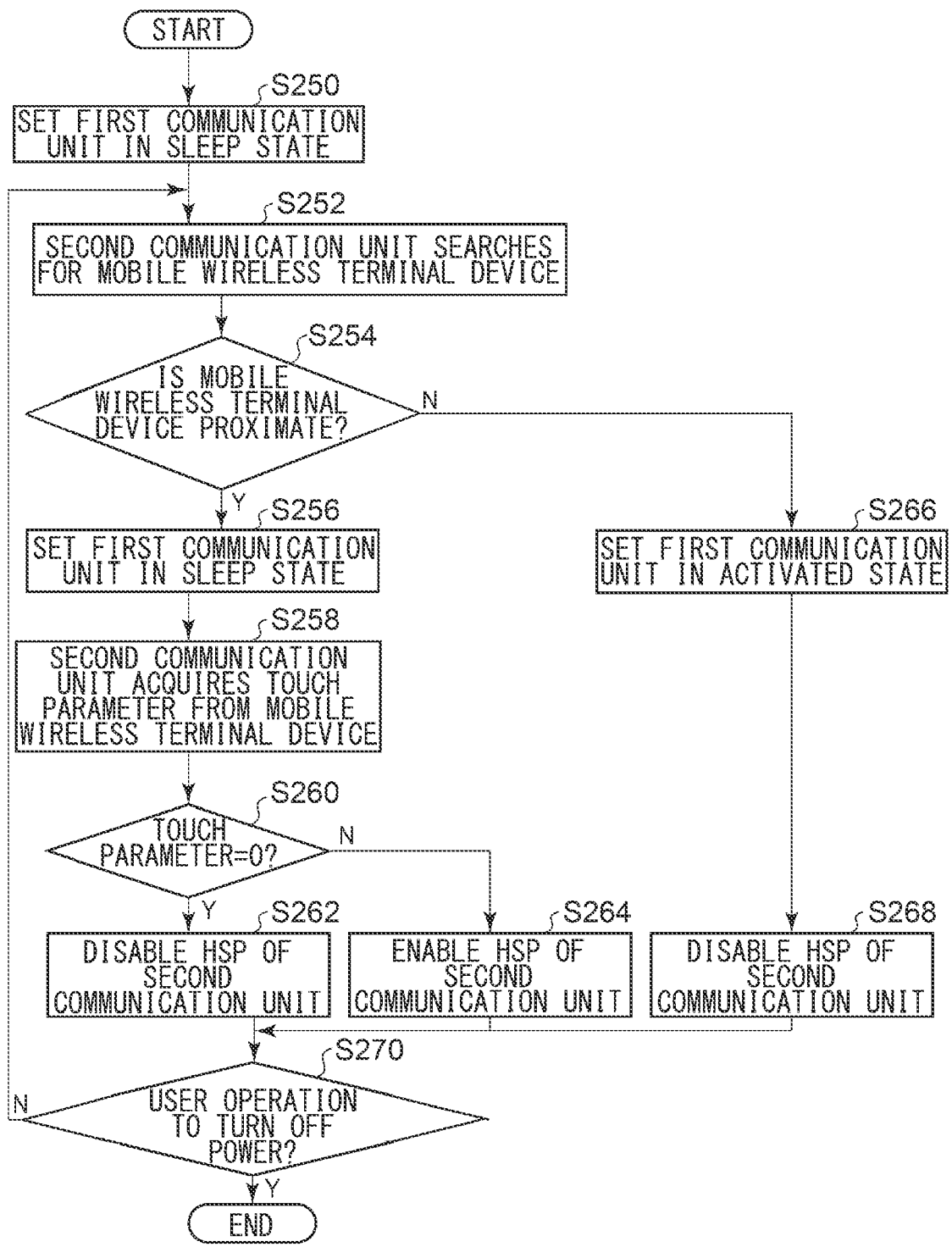
FIG. 10 is a flowchart showing a sequence of steps performed by the portable wireless terminal device according to embodiment 3.

FIG. 10 is a flowchart showing a sequence of steps performed by the portable wireless terminal device 300. The control unit 314 sets the first communication unit 310 in a sleep state (S250). The second communication unit 312 searches for the mobile wireless terminal device 200 (S252). When the mobile wireless terminal device 200 is proximate (Y in S254), the control unit 314 sets the first communication unit 310 in a sleep state (S256). The second communication unit 312 acquires the touch parameter from the mobile wireless terminal device 200 (S258). When the touch parameter is "0" (Y in S260), the control unit 314 sets the second communication unit 312 in a disabled HSP state (S262). When the touch parameter is not "0" (N in S260), the control unit 314 sets the second communication unit 312 in an enabled HSP state (S264). When the mobile wireless terminal device 200 is not proximate (N in S254), the control unit 314 sets the first communication unit 310 in an activated state (S266). The control unit 314 sets the second communication unit 312 in a disabled HSP state (S268). When a user operation to turn off the power is not performed (N in S270), control is returned to step S252. When a user operation to turn off the power is performed (Y in S270), the process is terminated.

According to this embodiment, when the touch parameter does not indicate "touched" in the case communication with the portable wireless terminal is enabled, business wireless communication is activated, and headset PTT communication according to the near-field wireless communication scheme is suspended so that the mobile wireless terminal device can be used when the portable wireless terminal device is proximate. Further, when the touch parameter indicates "touched" in the case communication with the portable wireless terminal is enabled, business wireless communication is activated, and headset PTT communication according to the near-field wireless communication scheme is activated so that contagion of an infectious disease can be inhibited. Further, when communication with the portable wireless terminal device is not enabled, business wireless communication is activated, and audio talk according to the near-field wireless communication scheme is suspended so that the mobile wireless terminal device can be used when the portable wireless terminal device is not proximate.

Further, when the touch parameter received from the mobile wireless terminal device does not indicate "touched" in the case communication with the mobile wireless terminal is enabled, business wireless communication is suspended, and headset PTT communication according to the near-field wireless communication scheme is suspended so that the mobile wireless terminal device can be used when the mobile wireless terminal device is proximate. Further, when the touch parameter received from the mobile wireless terminal device indicates "touched" in the case communication with the mobile wireless terminal device is enabled, business wireless communication is suspended, and headset PTT communication according to the near-field wireless communication scheme is activated so that contagion of an infectious disease can be inhibited. Further, when communication with the mobile wireless terminal device is not enabled, business wireless communication is activated, and headset PTT communication according to the near-field wireless communication scheme is suspended so that the mobile wireless terminal device can be used when the portable wireless terminal device is not proximate.

Described above is an explanation based on an exemplary embodiment. The embodiment is intended to be illustrative only and it will be understood by those skilled in the art that various modifications to constituting elements and processes could be developed and that such modifications are also within the scope of the present invention.

According to embodiments 1 through 3, the first wireless communication scheme in the wireless communication system 1000 uses business wireless communication. Alternatively, however, a wireless communication system other than business wireless communication may be used. According to this variation, the flexibility of configuration can be improved.

What is claimed is:

1. A wireless communication system comprising:
a first wireless terminal device comprising:
a first communication unit; a second communication unit, a management unit and a control unit;
a second wireless terminal device comprising:
a first communication unit; a second communication unit and a control unit;
the first communication unit and the second communication unit of the first wireless terminal device configured to perform wireless communication with the first communication unit and the second communication unit of the second wireless terminal device according to a first wireless communication scheme and a second wireless communication scheme respectively; wherein the second communication scheme is different from the first wireless communication scheme,
the management unit of the first wireless terminal device configured to manage a touch parameter indicating whether a user other than a user of the second wireless terminal device touches the first wireless terminal device,
when the second communication unit of the first wireless terminal device and the second communication unit of the second wireless terminal device are configured to perform wireless communication according to the second wireless communication scheme, the second communication unit of the second wireless terminal device is configured to receive the touch parameter from the first wireless terminal device,
when the touch parameter does not indicate "touched", the control unit of the first wireless terminal device is configured to activate wireless communication according to the first wireless communication scheme, and the control unit of the second wireless terminal device is configured to suspend wireless communication according to the first wireless communication scheme, and
when the touch parameter indicates "touched", the control unit of the first wireless terminal device is configured to activate wireless communication according to the first wireless communication scheme, and the control unit of the second wireless terminal device is configured to activate wireless communication according to the first wireless communication scheme.

2. The wireless communication system according to claim 1, wherein
when the first wireless terminal device is operated while a second communication unit of the first wireless terminal device cannot communicate with the second wireless terminal device, the first wireless terminal device sets the touch parameter to indicate "touched", and, when the second communication unit can communicate with the second wireless terminal device, the first wireless terminal device does not change setting of the touch parameter.

3. The wireless communication system according to claim 1, wherein
the second wireless terminal device includes a notification unit that outputs a notification when the touch parameter received from the first wireless terminal device indicates "touched".

4. A wireless communication system comprising:
a first wireless terminal device comprising:
a first communication unit; a second communication unit, a management unit and a control unit;
a second wireless terminal device comprising:
a first communication unit; a second communication unit and a control unit;
the first communication unit and the second communication unit of the first wireless terminal device configured to perform wireless communication with the first communication unit and the second communication unit of the second wireless terminal device according to a first wireless communication scheme and a second wireless communication scheme respectively; wherein the second communication scheme is different from the first wireless communication scheme,
the management unit of the first wireless terminal device configured to manage a touch parameter indicating whether a user other than a user of the second wireless terminal device touches the first wireless terminal device,
when the second communication unit of the first wireless terminal device and the second communication unit of the second wireless terminal device are configured to perform wireless communication according to the second wireless communication scheme, the second communication unit of the second wireless terminal device is configured to receive the touch parameter from the first wireless terminal device,
when the touch parameter does not indicate "touched", the control unit of the first wireless terminal device are configured to activate wireless communication according to the first wireless communication scheme, and the control unit of the second wireless terminal device become configured to suspend wireless communication according to the first wireless communication scheme, and
when the touch parameter indicates "touched", the control unit of the first wireless terminal device are configured to suspend wireless communication according to the first wireless communication scheme, and the control unit of the second wireless terminal device become configured to activate wireless communication according to the first wireless communication scheme.

5. The wireless communication system according to claim 4, wherein
when the first wireless terminal device is operated while a second communication unit of the first wireless terminal device cannot communicate with the second wireless terminal device, the first wireless terminal device sets the touch parameter to indicate "touched", and, when the second communication unit can communicate with the second wireless terminal device, the first wireless terminal device does not change setting of the touch parameter.

6. The wireless communication system according to claim 4, further comprising a notification unit that outputs a notification when the touch parameter received from the first wireless terminal device indicates "touched".

7. A wireless communication system comprising:
a first wireless terminal device comprising:
a first communication unit; a second communication unit, a management unit and a control unit;
a second wireless terminal device comprising:
a first communication unit; a second communication unit and a control unit;
the first communication unit and the second communication unit of the first wireless terminal device configured to perform wireless communication with the first communication unit and the second communication unit of the second wireless terminal device according to a first wireless communication scheme and a second wireless communication scheme respectively; wherein the second communication scheme is different from the first wireless communication scheme, the management unit of the first wireless terminal device configured to manage a touch parameter indicating whether a user other than a user of the second wireless terminal device touches the first wireless terminal device, when the second communication unit of the first wireless terminal device and the second communication unit of the second wireless terminal device configured to perform wireless communication according to the second wireless communication scheme, the second communication unit of the second wireless terminal device is configured to receive the touch parameter from the first wireless terminal device, when the touch parameter does not indicate "touched", the control unit of the first wireless terminal device configured to activate wireless communication according to the first wireless communication scheme and suspend headset PTT communication according to the second wireless communication scheme, and the control unit of the second wireless terminal device configured to suspend wireless communication according to the first wireless communication scheme and suspend headset PTT communication according to the second wireless communication scheme, and when the touch parameter indicates "touched", the control unit of the first wireless terminal device becomes configured to activate wireless communication according to the first wireless communication scheme and activate headset PTT communication according to the second wireless communication scheme, and the control unit of the second wireless terminal device becomes configured to suspend wireless communication according to the first wireless communication scheme and activate headset PTT communication according to the second wireless communication scheme.

8. The wireless communication system according to claim 7, wherein when a second communication unit of the first wireless terminal device cannot communicate with the second wireless terminal device, the first wireless terminal device activates a first communication unit and suspends headset PTT communication of the second communication unit.

9. The wireless communication system according to claim 7, when a second communication unit in the second wireless terminal device cannot communicate with the first wireless terminal device, a first communication unit is activated, and headset PTT communication of the second communication unit is suspended.

* * * * *